US012647939B2

(12) United States Patent　　(10) Patent No.:　US 12,647,939 B2

Hong　　(45) Date of Patent:　Jun. 2, 2026

(54) METHOD FOR TRANSCEIVING INDICATION, METHOD FOR DETERMINING RESPONSE, AND INDICATION METHOD

(71) Applicant: BEIJING XIAOMI MOBILE SOFTWARE CO., LTD., Beijing (CN)

(72) Inventor: Wei Hong, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 315 days.

(21) Appl. No.: 18/288,755

(22) PCT Filed: Apr. 30, 2021

(86) PCT No.: PCT/CN2021/091719

§ 371 (c)(1),
(2) Date: Oct. 27, 2023

(87) PCT Pub. No.: WO2022/227074

PCT Pub. Date: Nov. 3, 2022

(65) Prior Publication Data

US 2024/0214983 A1　　Jun. 27, 2024

(51) Int. Cl.
　*H04W 68/00*　　(2009.01)
　*H04W 8/18*　　(2009.01)
(52) U.S. Cl.
　CPC .........　*H04W 68/005* (2013.01); *H04W 8/183* (2013.01)
(58) Field of Classification Search
　None
　See application file for complete search history.

(56) References Cited

U.S. PATENT DOCUMENTS

| | | | |
|---|---|---|---|
| 2015/0050952 A1* | 2/2015 | Ponukumati | H04W 68/02 455/458 |
| 2015/0057046 A1* | 2/2015 | Challa | H04W 48/12 455/558 |
| 2016/0249408 A1* | 8/2016 | Thiruvenkatachari | H04W 76/38 |
| 2021/0014667 A1 | 1/2021 | Lovlekar et al. | |
| 2021/0105607 A1 | 4/2021 | Ioffe et al. | |

FOREIGN PATENT DOCUMENTS

| | | |
|---|---|---|
| CN | 112218310 A1 | 1/2021 |
| CN | 112514472 A | 3/2021 |
| WO | WO 2020209620 A1 | 10/2020 |
| WO | WO 2020209641 A1 | 10/2020 |
| WO | WO 2020247043 A1 | 12/2020 |

(Continued)

OTHER PUBLICATIONS

European Patent Application No. 21938548.1 Search Report dated Jan. 30, 2025, 14 pages.

(Continued)

*Primary Examiner* — Adolf Dsouza
(74) *Attorney, Agent, or Firm* — Cozen O'Connor

(57)　　　ABSTRACT

A method for transceiving an indication in a wireless communication network is performed by a core network and includes: receiving first indication information from a communication device, in which the first indication information is configured to indicate that a first subscriber identity module (SIM) in a multi-SIM terminal does not respond to paging.

15 Claims, 9 Drawing Sheets receiving first indication information from a communication device, wherein the first indication information is configured to indicate that a first SIM in a multi-SIM terminal does not respond to paging — S101 receiving request information from the first base station, wherein the request information is configured to request the core network to indicate the second base station to pause communicating with the second SIM — S201

(56)            References Cited

FOREIGN PATENT DOCUMENTS

| | | | |
|---|---|---|---|
| WO | WO 2020256489 A1 | 12/2020 | |
| WO | WO 2021015502 A1 | 1/2021 | |

OTHER PUBLICATIONS

3rd Generation Partnership Project; Technical Specification Group Services and System Aspects; Study on system enablers for devices having multiple Universal Subscriber Identity Modules (USIM) (Release 17), Jun. 2021, 111 pages.

PCT/CN2021/091719 International Search Report dated Jan. 26, 2022, 3 pages.

Huawei et al. "On coordinated switch from NW for MUSIM device", 3GPP TSG-RAN WG2 Meeting #113 electronic, R2-2101276, Jan.-Feb. 2021, 5 pages.

Indian Patent Application No. 202347079113 Office Action dated Oct. 13, 2025, 3 pages.

* cited by examiner

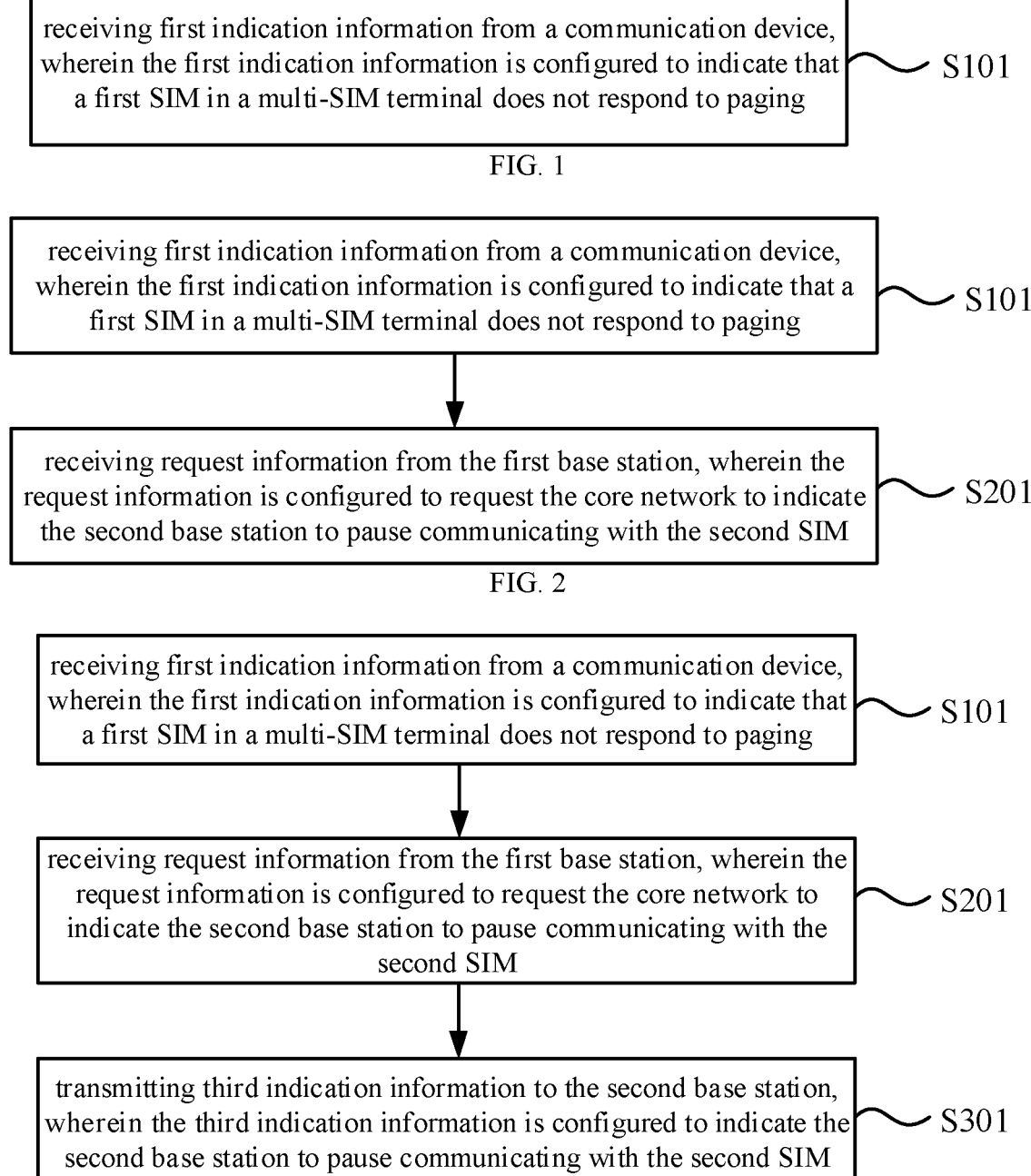

receiving first indication information from a communication device, wherein the first indication information is configured to indicate that a first SIM in a multi-SIM terminal does not respond to paging          S101

FIG. 1 receiving first indication information from a communication device, wherein the first indication information is configured to indicate that a first SIM in a multi-SIM terminal does not respond to paging          S101 receiving request information from the first base station, wherein the request information is configured to request the core network to indicate the second base station to pause communicating with the second SIM          S201

FIG. 2 receiving first indication information from a communication device, wherein the first indication information is configured to indicate that a first SIM in a multi-SIM terminal does not respond to paging          S101 receiving request information from the first base station, wherein the request information is configured to request the core network to indicate the second base station to pause communicating with the second SIM          S201 transmitting third indication information to the second base station, wherein the third indication information is configured to indicate the second base station to pause communicating with the second SIM          S301

FIG. 3

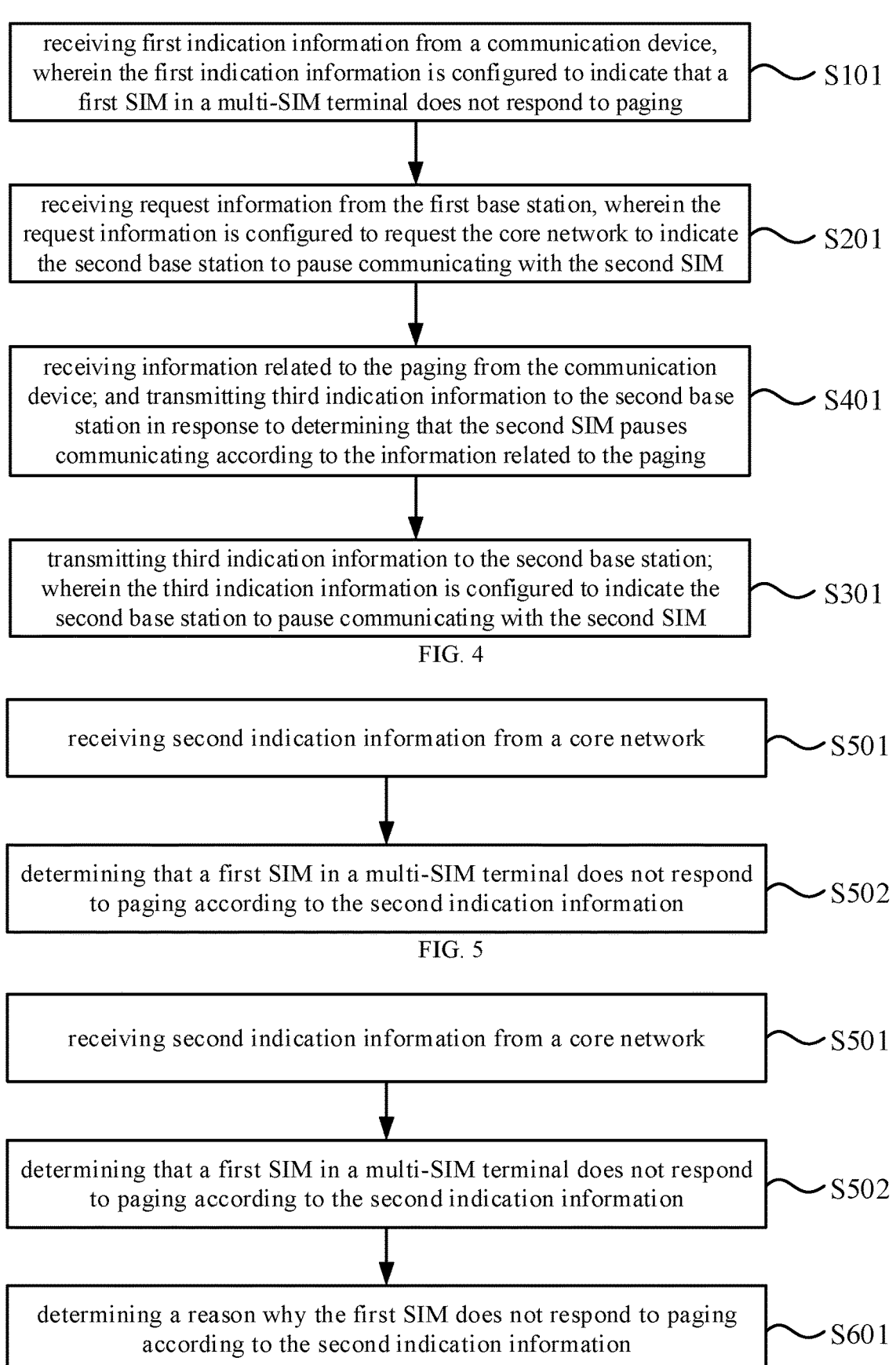

receiving first indication information from a communication device, wherein the first indication information is configured to indicate that a first SIM in a multi-SIM terminal does not respond to paging — S101 receiving request information from the first base station, wherein the request information is configured to request the core network to indicate the second base station to pause communicating with the second SIM — S201 receiving information related to the paging from the communication device; and transmitting third indication information to the second base station in response to determining that the second SIM pauses communicating according to the information related to the paging — S401 transmitting third indication information to the second base station; wherein the third indication information is configured to indicate the second base station to pause communicating with the second SIM — S301

FIG. 4 receiving second indication information from a core network — S501 determining that a first SIM in a multi-SIM terminal does not respond to paging according to the second indication information — S502

FIG. 5 receiving second indication information from a core network — S501 determining that a first SIM in a multi-SIM terminal does not respond to paging according to the second indication information — S502 determining a reason why the first SIM does not respond to paging according to the second indication information — S601

FIG. 6

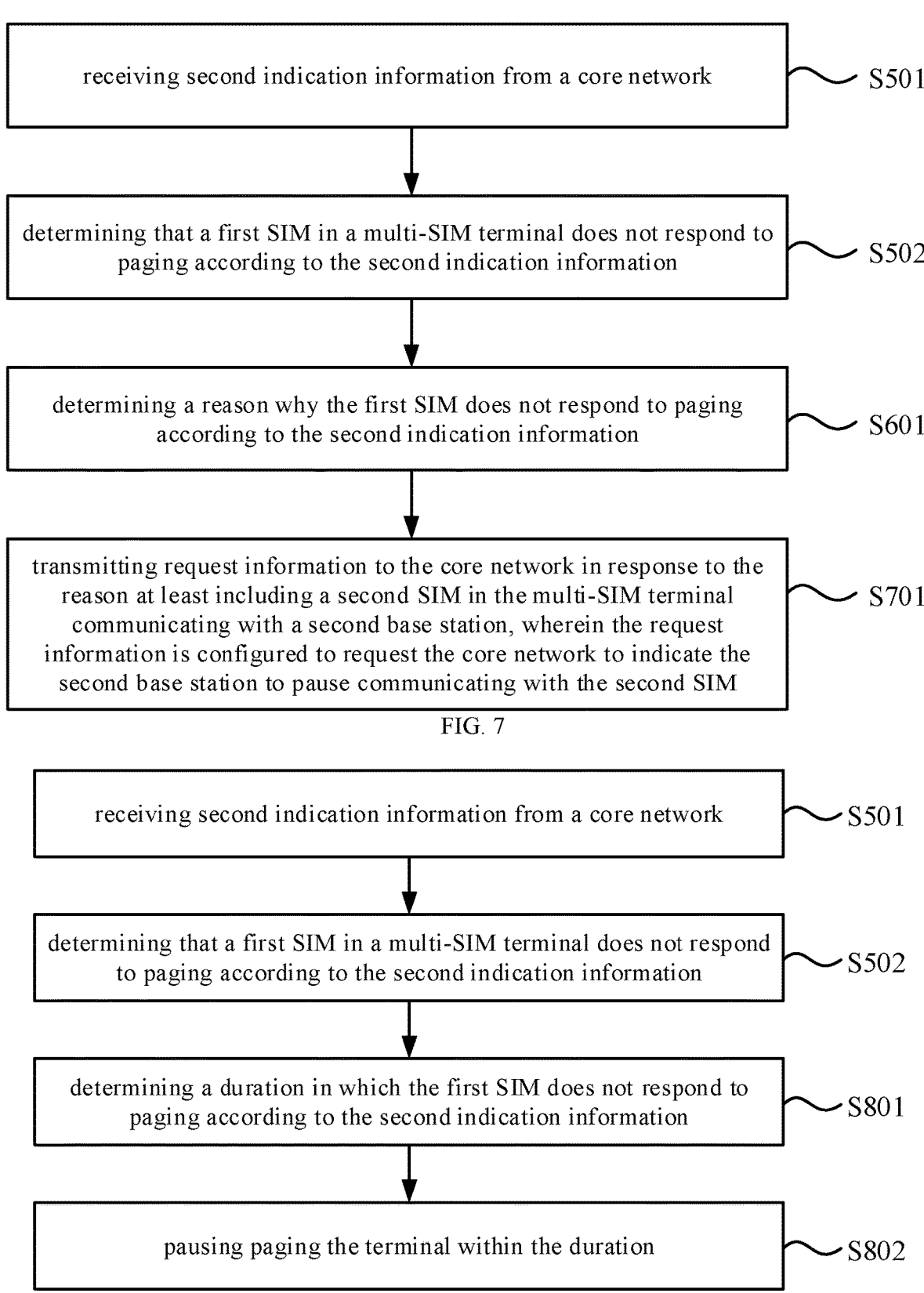

receiving second indication information from a core network — S501 determining that a first SIM in a multi-SIM terminal does not respond to paging according to the second indication information — S502 determining a reason why the first SIM does not respond to paging according to the second indication information — S601 transmitting request information to the core network in response to the reason at least including a second SIM in the multi-SIM terminal communicating with a second base station, wherein the request information is configured to request the core network to indicate the second base station to pause communicating with the second SIM — S701

FIG. 7 receiving second indication information from a core network — S501 determining that a first SIM in a multi-SIM terminal does not respond to paging according to the second indication information — S502 determining a duration in which the first SIM does not respond to paging according to the second indication information — S801 pausing paging the terminal within the duration — S802

FIG. 8

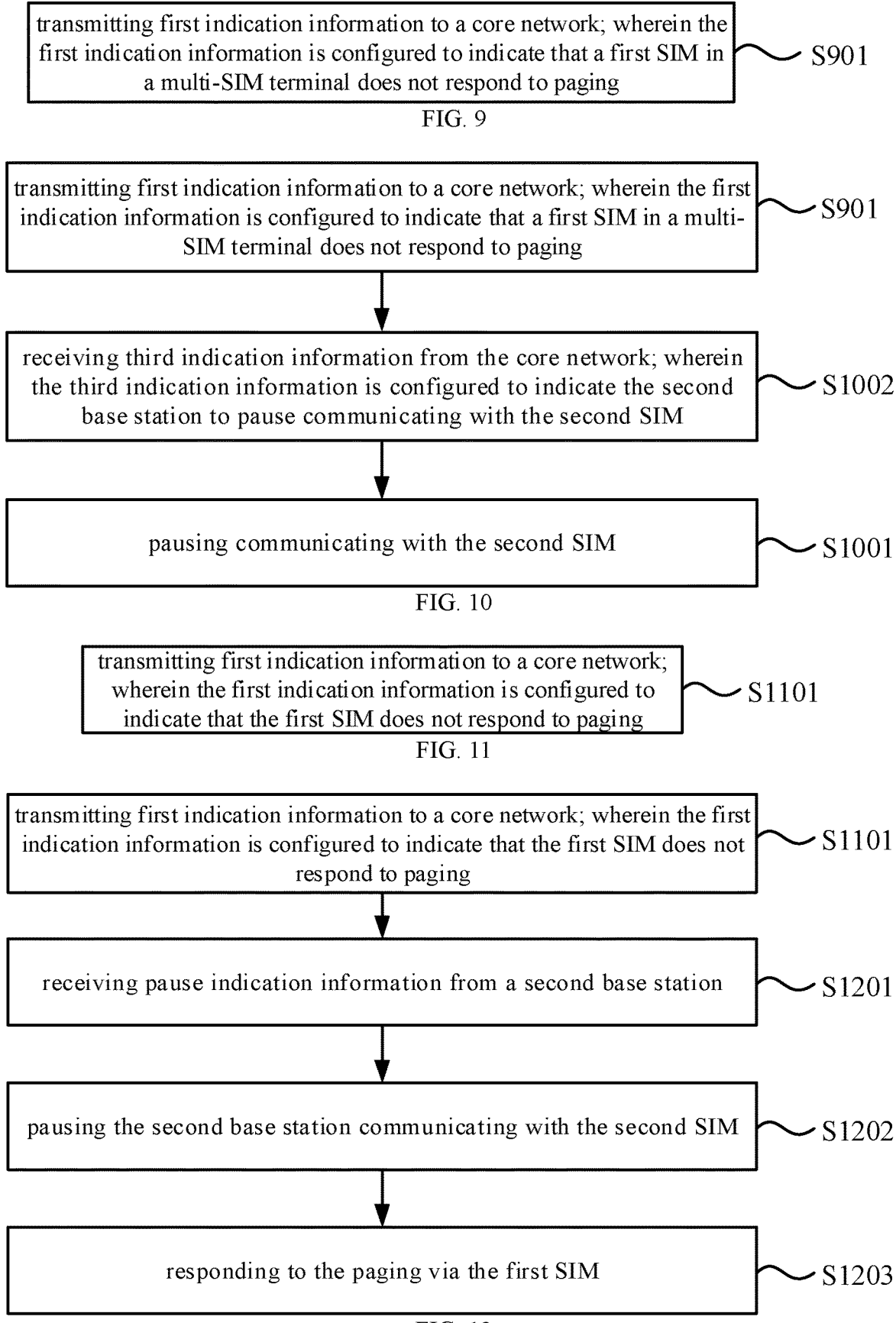

transmitting first indication information to a core network; wherein the first indication information is configured to indicate that a first SIM in a multi-SIM terminal does not respond to paging    S901

FIG. 9 transmitting first indication information to a core network; wherein the first indication information is configured to indicate that a first SIM in a multi-SIM terminal does not respond to paging    S901 receiving third indication information from the core network; wherein the third indication information is configured to indicate the second base station to pause communicating with the second SIM    S1002 pausing communicating with the second SIM    S1001

FIG. 10 transmitting first indication information to a core network; wherein the first indication information is configured to indicate that the first SIM does not respond to paging    S1101

FIG. 11 transmitting first indication information to a core network; wherein the first indication information is configured to indicate that the first SIM does not respond to paging    S1101 receiving pause indication information from a second base station    S1201 pausing the second base station communicating with the second SIM    S1202 responding to the paging via the first SIM    S1203

FIG. 12

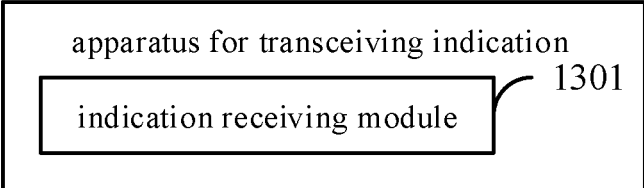

apparatus for transceiving indication indication receiving module — 1301

FIG. 13

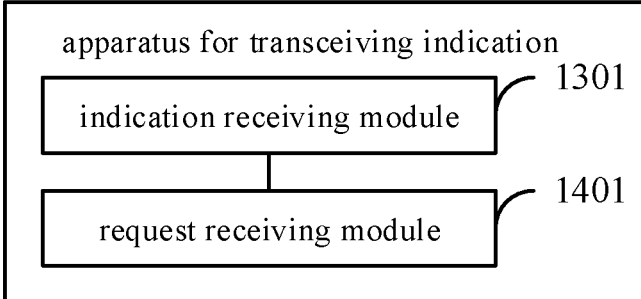

apparatus for transceiving indication indication receiving module — 1301 request receiving module — 1401

FIG. 14

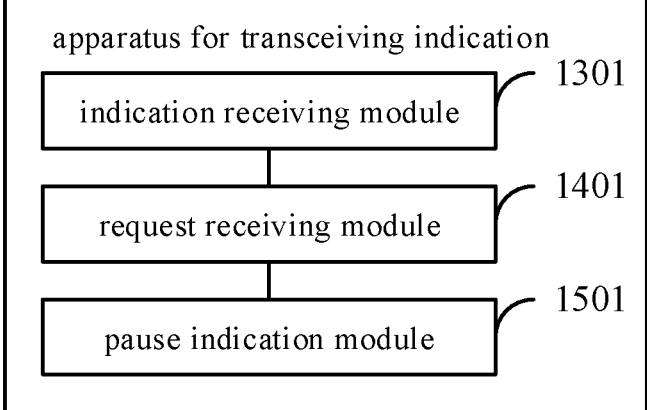

apparatus for transceiving indication indication receiving module — 1301 request receiving module — 1401 pause indication module — 1501

FIG. 15

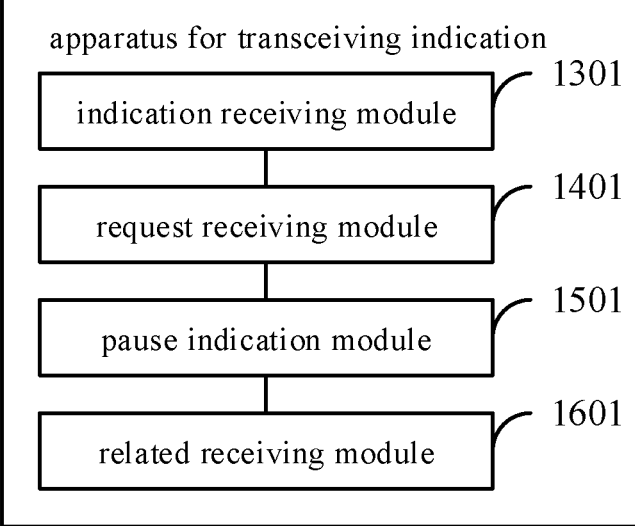

apparatus for transceiving indication indication receiving module — 1301 request receiving module — 1401 pause indication module — 1501 related receiving module — 1601

2422 processing component wireless transmitting/receiving component

2424 antenna component

2426

METHOD FOR TRANSCEIVING INDICATION, METHOD FOR DETERMINING RESPONSE, AND INDICATION METHOD

CROSS-REFERENCE TO RELATED APPLICATION

This application is a national phase of International Application No. PCT/CN2021/091719, filed on Apr. 30, 2021, the entire content of which is incorporated herein by reference.

TECHNICAL FIELD

The disclosure relates to the field of communication technologies, and specifically to a method for transceiving an indication, a method for determining a response, and an indication method.

BACKGROUND

Terminals in a wireless communication network may be provided with multiple subscriber identity modules (SIMs) to function as a multi-SIM terminal. The terminal may communicate with one or multiple networks via the multiple SIMs. However, communication conflicts may occur among the multiple SIMs when deciding how to connect with communication networks.

SUMMARY

According to a first aspect of the disclosure, a method for transceiving an indication is provided and is applicable to a core network. The method includes: receiving first indication information from a communication device, in which the first indication information is configured to indicate that a first subscriber identity module (SIM) in a multi-SIM terminal does not respond to paging.

According to a second aspect of the disclosure, a method for determining a response is provided and is applicable to a first base station. The method includes: receiving second indication information from a core network; and determining that a first SIM in a multi-SIM terminal does not respond to paging according to the second indication information.

According to a third aspect of the disclosure, an indication method is provided and is applicable to a terminal configured with a second SIM and a first SIM. The method includes: transmitting first indication information to a core network, in which the first indication information is configured to indicate that the first SIM does not respond to paging.

BRIEF DESCRIPTION OF THE DRAWINGS

In order to more clearly illustrate technical solutions in embodiments of the disclosure, a brief description of drawings used in descriptions of the embodiments is given below. Obviously, the drawings in the following descriptions are only some embodiments of the disclosure, and for those skilled in the art, other drawings may be obtained according to these drawings without creative labor.

FIG. 1 is a schematic flowchart illustrating a method for transceiving an indication applicable to a core network according to embodiments of the disclosure.

FIG. 2 is a schematic flowchart illustrating another method for transceiving an indication according to embodiments of the disclosure.

FIG. 3 is a schematic flowchart illustrating still another method for transceiving an indication according to embodiments of the disclosure.

FIG. 4 is a schematic flowchart illustrating still another method for transceiving an indication according to embodiments of the disclosure.

FIG. 5 is a schematic flowchart illustrating a method for transceiving an indication applicable to a first base station according to embodiments of the disclosure.

FIG. 6 is a schematic flowchart illustrating another method for transceiving an indication according to embodiments of the disclosure.

FIG. 7 is a schematic flowchart illustrating still another method for transceiving an indication according to embodiments of the disclosure.

FIG. 8 is a schematic flowchart illustrating still another method for transceiving an indication according to embodiments of the disclosure.

FIG. 9 is a schematic flowchart illustrating an indication method applicable to a second base station according to embodiments of the disclosure.

FIG. 10 is a schematic flowchart illustrating another indication method according to embodiments of the disclosure.

FIG. 11 is a schematic flowchart illustrating an indication method applicable to a terminal according to embodiments of the disclosure.

FIG. 12 is a schematic flowchart illustrating another indication method according to embodiments of the disclosure.

FIG. 13 is a schematic block diagram illustrating an apparatus for transceiving an indication applicable to a core network according to embodiments of the disclosure.

FIG. 14 is a schematic block diagram illustrating another apparatus for transceiving an indication according to embodiments of the disclosure.

FIG. 15 is a schematic block diagram illustrating still another apparatus for transceiving an indication according to embodiments of the disclosure.

FIG. 16 is a schematic block diagram illustrating still another apparatus for transceiving an indication according to embodiments of the disclosure.

DETAILED DESCRIPTION

Figure 17:
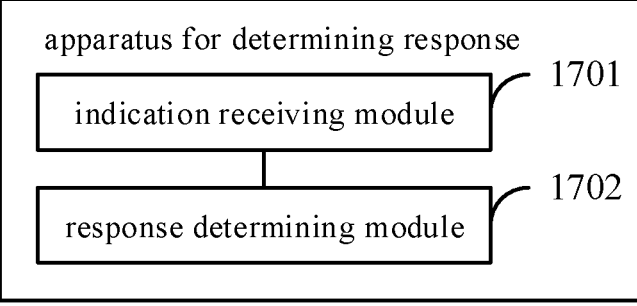
FIG. 17 is a schematic block diagram illustrating an apparatus for transceiving an indication applicable to a first base station according to embodiments of the disclosure.

Technical solutions in embodiments of the disclosure will be clearly and completely described below with reference to the accompanying drawings in the embodiments of the disclosure. Obviously, the described embodiments are only a part of the embodiments of the disclosure, but not all of the embodiments. Based on the embodiments in the disclosure, all other embodiments obtained by a person skilled in the art without creative efforts shall fall within the protection scope of the disclosure.

Terms used in embodiments of the disclosure are merely for describing specific examples and are not intended to limit the embodiments of the disclosure. The singular forms "a" and "the" used in the embodiments of the disclosure and the appended claims are also intended to include a multiple form, unless other meanings are clearly represented in the context. It should also be understood that the term "and/or" used in the disclosure refers to any or all of possible combinations including one or more associated listed items.

It should be understood that although terms "first", "second", "third", and the like are used in the embodiments of the disclosure to describe various information, the information is not limited to the terms. These terms are merely used to differentiate information of a same type. For example, without departing from the scope of the embodiments of the disclosure, first information is also referred to as second information, and similarly the second information is also referred to as the first information. Depending on the context, for example, the term "if" used herein may be explained as "when" or "while", or "in response to . . . , it is determined that".

For the purpose of concision and ease of understanding, the terms "greater than" or "less than", "higher than" or "lower than" are used herein when characterizing the relationship of sizes. However, those skilled in the art may understand that the term "greater than" also covers the meaning of "greater than or equal to" and "less than" also covers the meaning of "less than or equal to"; and the term "higher than" covers the meaning of "higher than or equal to" and "lower than" covers the meaning of "lower than or equal to".

Multiple subscriber identity modules (SIMs) may be provided in a terminal as a multi-SIM terminal. The terminal may communicate via the multiple SIMs. However, communication conflicts may occur among the multiple SIMs in communication processes.

For example, when SIM #1 communicates with base station A, SIM #2 receives paging of base station B and the terminal may decide not to respond to the paging of base station B to prevent the communication between SIM #1 and base station A from being uninterrupted. In this case, base station B may mistakenly think that there is a paging problem and continue paging SIM #2, and even increase a paging power, which results in wasting the resources of base station B.

FIG. 1 is a schematic flowchart illustrating a method for transceiving an indication according to embodiments of the disclosure. The indication method as illustrated in the embodiments is applicable to a core network. The core network may communicate with a communication device such as a first base station, a second base station, and a terminal.

The second base station and the first base station include but not limited to a base station in a communication system such as a fourth generation (4G) base station, a fifth generation (5G) base station, and a sixth generation (6G) base station. The terminal includes but not limited to a communication device such as a mobile phone, a tablet computer, a wearable device, a sensor, and an Internet of things device.

In some embodiments, the terminal may be a multi-SIM terminal. Multiple SIMs may be configured in the terminal. Embodiments of the disclosure are illustrated when the terminal is configured with a first SIM and a second SIM.

As illustrated in FIG. 1, the indication method may include the following step.

At step S101, first indication information from a communication device is received. The first indication information is configured to indicate that a first SIM in a multi-SIM terminal does not respond to paging.

In some embodiments, the first base station may page the first SIM in the terminal, for example, the first base station may transmit a paging signaling via broadcast, unicast, or multicast to the terminal. The first SIM in the terminal may respond to the paging when receiving the paging of the first base station, for example the first SIM in the terminal may initiate a random access to the first base station, or the first SIM in the terminal may not respond to the paging when receiving the paging of the first base station.

According to embodiments of the disclosure, when the communication device determines that the first SIM in the terminal does not respond to paging, the communication device may inform the core network via the first indication information that the first SIM in the terminal does not respond to paging. Therefore, the core network may further inform the first base station paging the first SIM, so that the first base station determines that the first SIM does not respond to paging, which is not because a problem occurs in a paging process but because the terminal where the first SIM is located autonomously determines that the first SIM does not respond to paging.

In some embodiments, the first indication information is further configured to indicate that the first SIM in the multi-SIM terminal, paged by the first base station, has received the paging of the first base station. Therefore, the core network may further indicate that the first SIM in the multi-SIM terminal paged by the first base station has received the paging of the first base station via the second indication information, so that the first base station learns that the multi-SIM has received the paging of the first base station but does not respond to the paging, rather than not respond to the paging since the first SIM does not receive the paging of the first base station.

In some embodiments, the method further includes: transmitting second indication information to the first base station. The second indication information is configured to indicate that the first SIM in the multi-SIM terminal does not respond to paging.

The core network may generate the second information and transmit the second information to the first base station or transparently transmits the first information as the second information to the first base station when determining that the first SIM in the multi-SIM terminal does not respond to paging, to inform the first base station that the first SIM does not respond to paging.

Accordingly, the first base station may determine that no problem occurs in the paging process. Therefore, unnecessary operations (such as improving a paging power and changing a paging manner) may not be performed, which is beneficial to avoid resource wastes. For example, the first base station may pause paging the first SIM in the terminal when receiving the first indication information.

In some embodiments, the method further includes: pausing paging the first SIM.

A paging operation is generally triggered by the core network. For example, when the core network needs to page the first SIM, the core network may indicate a base station in a tracking area where the first SIM to page the first SIM.

In some embodiments, the core network may pause paging the first SIM in response to determining that the first SIM does not respond to paging according to the first information. For example, the core network may delay receiving service data from the first SIM, such as indicate the first base station to pause paging the first SIM.

In some embodiments, the communication device includes at least one of: a terminal (e.g. the multi-SIM terminal) or a base station (e.g. the second base station).

When the communication device is the terminal, the communication device may be the multi-SIM terminal where the first SIM is located, and the multi-SIM terminal may transmit the first indication information carried in a non-access stratum signaling (transparently transmit via the base station) to the core network, for example, may transmit the first indication information carried in the non-access stratum signaling to the core network via the second SIM in the multi-SIM terminal; and the communication device may be another terminal, the multi-SIM terminal may first transmit the first indication information (for example, via a side link) to the communication device, and the communication device transmit it to the core network.

When the communication device is the base station, the communication device may be the second base station that is communicating with the second SIM in the multi-SIM terminal where the first SIM is located, and the second base station acquires the first indication information from the second SIM and further transmits the first indication information to the core network.

It should be noted that, the second SIM and the first SIM do not refer to certain SIMs in particular but refer to any two different SIMs in the terminal. The SIM in all embodiments of the disclosure includes but not limited to a universal subscriber identity module (USIM) or an extended subscriber identity module (eSIM).

In some embodiments, the first indication information is further configured to indicate a reason why the first SIM does not respond to the paging.

In some embodiments, the reason why the first SIM does not respond to the paging of the first base station may be carried in the first indication information. The reason may be a direct reason, for example, the terminal is communicating with the second base station by using the second SIM, and the reason may be an indirect reason, for example, service information that the second SIM communicates with the second base station. The service information, for example, may be a type of service, a priority of service, a data volume of data to be transmitted by the service, etc.

The first base station may determine the reason why the first SIM does not respond to the paging of the first base station when receiving the first indication information from the core network, thereby deciding a subsequent action.

FIG. 2 is a schematic flowchart illustrating another method for transceiving an indication according to embodiments of the disclosure. As illustrated in FIG. 2, the reason at least includes a second SIM in the multi-SIM terminal communicating with a second base station. The method further includes the following step.

At step S201, request information from the first base station is received. The request information is configured to request the core network to indicate the second base station to pause communicating with the second SIM.

In some embodiments, when the first base station determines that the reason why the first SIM does not respond to the paging of the first base station includes the terminal communicating with the second base station via the second SIM, and if the first base station determines to still page the first SIM based on its own requirement, the first base station may transmit the request information to the core network, to request the core network to indicate the second base station to pause communicating with the second SIM, so that the terminal may respond to the paging by using the first SIM.

Accordingly, when the first base station still needs to page the first SIM, it may request the core network to indicate the second base station to pause the communication process with the second SIM, and further the terminal may respond to the paging of the first base station by using the first SIM.

It should be noted that, in all embodiments of the disclosure, the SIM communicates with the base station, which specifically means that, the terminal where the SIM is located communicates with the base station. The terminal may communicate with the base station via the SIM and a processor and a radio frequency transceiving element in the terminal. The element directly communicating with the base station may be the radio frequency transceiving element. Information that needs to be transmitted by the radio frequency transceiving element may be from the SIM and information received by the radio frequency transceiving element may be transmitted to the SIM first.

For example, the second SIM communicates with the second base station indicated in the above embodiments means that the terminal where the second SIM is located communicates with the base station based on the identity of the second SIM. Similarly, the first SIM communicates with the first base station, which means that the terminal where the first SIM is located communicates with the base station based on the identity of the first SIM. For example, the first SIM receives the paging of the first base station, which specifically means that the first SIM in the terminal where the first SIM is located receives the paging of the first base station.

In some embodiments, service information that the second SIM communicates with the second base station may be further carried in the first indication information. The first base station may determine service information to be performed by paging the first SIM, compare two pieces of service information, may transmit the request information to the second base station when determining that the service to be performed by paging the first SIM is relatively urgent, and not transmit the request information to the second base station when the service that the second SIM communicates with the second base station is relatively urgent.

Alternatively, the first base station may carry information of the service to be performed by paging the first SIM in the request information, and the core network determines which of the service for communicating with the second SIM and the service for paging the first SIM by the first base station is more urgent, may select to indicate the second base station to pause communicating with the second SIM when the service for paging the first SIM by the first base station is more urgent, and not indicate the second base station to pause communicating with the second SIM when the service for communicating the second SIM with the second base station is relatively urgent.

FIG. 3 is a schematic flowchart illustrating still another method for transceiving an indication according to embodiments of the disclosure. As illustrated in FIG. 3, the method further includes the following step.

At step S301, third indication information is transmitted to the second base station. The third indication information is configured to indicate the second base station to pause communicating with the second SIM.

In some embodiments, when the core network determines that the second base station needs to pause communicating with the second SIM, the third indication information may be transmitted to the second base station and the third indication information is configured to indicate the second base station to pause communicating with the second SIM.

A basis that the core network determines that the second base station needs to pause communicating with the second SIM, includes but not limited to the request information of the first base station being received by the core network, and the core network determining that the service to be performed by the first base station to page the first SIM is more urgent.

The second base station may indicate the second SIM in the terminal to pause communicating with the second base station when receiving the third indication information, and the terminal may control the second SIM to pause communicating with the second base station. For example, it may remain in a connected state and pause uplink and downlink communication with the second base station or may enter a non-connected state (such as an idle state and an inactive state). When the second SIM pauses communicating with the second base station, the terminal may respond to the paging of the first base station via the first SIM, for example, the terminal may initiate a random access to the first base station via the first SIM.

It should be noted that, in all embodiments of the disclosure, an indication for an SIM may specifically act on a terminal where the SIM is located.

For example, in the above embodiments, the second SIM is indicated to pause communicating with the second base station. In detail, the radio frequency transceiving element receives the indication information from the second base station, and transmits the indication information to the second SIM. The second SIM further transmits the indication information to the processor of the terminal. The processor of the terminal parses and determines meaning of the indication information, and controls the second SIM to pause communicating with the second base station based on the meaning of the indication information, so that the terminal may pause transmitting information to the second base station or receiving information from the second base station based on the identity of the second SIM.

FIG. 4 is a schematic flowchart illustrating still another method for transceiving an indication according to embodiments of the disclosure. As illustrated in FIG. 4, the method further includes the following step.

At step S401, information related to the paging from the communication device is received; and third indication information is transmitted to the second base station in response to determining that the second SIM pauses communicating according to the information related to the paging. An execution sequence of step S401 may be adjusted based on requirements, which is not after step S201 as illustrated in FIG. 4 and may be before step S201 or step S102.

In some embodiments, the first base station may transmit the information related to the paging, transmitted to the first SIM, to the core network, and the related information includes, but is not limited to, information about a service to be performed by the first base station to page the first SIM, and according to the information, the core network may determine which of the service to be performed by the second base station to communicate with the second SIM and the service to be performed by the first base station to page the first SIM is more urgent.

In response to determining that the service to be performed by the first base station for paging the first SIM is more urgent, it is determined that the second base station needs to pause communicating with the second SIM, thus the third indication information may be transmitted to the second base station to indicate that the second base station pauses communicating with the second SIM. Further the second base station may transmit the indication information to the terminal, so that the terminal pauses communicating with the second base station via the second SIM.

It should be noted that, the terminal may pause communication between the second SIM and the second base station when receiving the indication information from the second base station, and may further select to respond to the paging of the first base station via the first SIM, or may further select to perform other actions rather than respond to the paging of the first base station via the first SIM. When the second base station explicitly indicates that not only the terminal needs to pause communication between the second SIM and the second base station but also needs to respond to the paging of the first base station via the first SIM based on the indication information, the terminal pauses the communication between the second SIM and the second base station and further needs to respond to the paging of the first base station via the first SIM.

In some embodiments, the first indication information is further configured to indicate a duration in which the first SIM does not respond to paging. The duration in which the first SIM does not respond paging may be further carried in the first indication information, so that the core network may transmit the duration carried in the second indication information to the first base station and the first base station determines that it may not repage the terminal within the duration.

It should be noted that, other than the duration that may be carried in the first indication information, the duration may be determined by the core network. For example, the duration may be determined based on the communication situation between the second base station and the second SIM. The duration required by completing the communication between the second base station and the second SIM may be determined as the duration.

FIG. 5 is a schematic flowchart illustrating a method for transceiving an indication according to embodiments of the disclosure. The method for transceiving an indication as illustrated in the disclosure is applicable to a first base station. The first base station may communicate with a core network or a terminal as a user equipment (UE).

The first base station includes but not limited to a base station in a communication system, such as a 4G base station, a 5G base station, and a 6G base station. The terminal includes but not limited to a communication device such as a mobile phone, a tablet computer, a wearable device, a sensor, and an Internet of things device.

As illustrated in FIG. 5, the method for transceiving the indication may include following steps.

At step S501, second indication information from a core network is received.

At step S502, it is determined that a first SIM in a multi-SIM terminal does not respond to paging according to the second indication information.

In some embodiments, the first base station may page the first SIM in the multi-SIM terminal, for example, the first base station may transmit a paging signaling via broadcast, unicast, or multicast to the multi-SIM terminal. The first SIM in the multi-SIM terminal may respond to the paging when receiving the paging of the first base station, for example, the first SIM in the terminal may initiate a random access to the first base station, or the first SIM in the terminal may not respond to the paging when receiving the paging of the first base station.

According to embodiments of the disclosure, in response to determining that the first SIM in the terminal does not respond to paging, the core network may inform the first base station via the second indication information that the first SIM in the terminal receives the paging of the first base station but does not respond to the paging.

Accordingly, the first base station may determine that the first SIM in the terminal does not respond to paging because the terminal where the first SIM is located autonomously decides not to respond to the paging, no problem occurs in the paging process, and unnecessary operations may not be performed, which helps avoid resource wastes. For example, the first base station may pause paging the terminal when receiving the first indication information.

In some embodiments, determining that the first SIM in the multi-SIM terminal does not respond to paging according to the second indication information includes: determining, according to the second indication information, that the first SIM in the multi-SIM terminal, paged by the first base station, has received paging of the first base station and the first SIM does not respond to the paging.

FIG. 6 is a schematic flowchart illustrating another method for transceiving an indication according to embodiments of the disclosure. As illustrated in FIG. 6, the method further includes the following step.

At step S601, a reason why the first SIM does not respond to paging is determined according to the second indication information.

In some embodiments, the core network may determine the reason why the first SIM in the terminal does not respond to the paging of the first base station, and transmit the reason carried in the second indication information to the first base station, so that the first base station learns the reason why the first SIM in the terminal does not respond to the paging of the first base station.

For example, the terminal may transmit first indication information to the core network. The reason why the first SIM in the terminal does not respond to the paging of the first base station may be carried in the first indication information. The reason may be a direct reason, for example, the terminal is communicating with the second base station by using the second SIM, and the reason may be an indirect reason, for example, service information that the second SIM communicates with the second base station. The service information, for example, may be a type of service, a priority of service, a data volume of data to be transmitted by the service, etc.

The core network may determine the reason why the first SIM in the terminal does not respond to the paging of the first base station when receiving the first indication information, and further carry the reason in the second indication information that is transmitted to the first base station, so that the first base station learns the reason why the first SIM in the terminal does not respond to the paging of the first base station.

FIG. 7 is a schematic flowchart illustrating still another method for transceiving an indication according to embodiments of the disclosure. As illustrated in FIG. 7, the method further includes the following step.

At step S701, request information is transmitted to the core network in response to the reason at least including a second SIM in the multi-SIM terminal communicating with a second base station. The request information is configured to request the core network to indicate the second base station to pause communicating with the second SIM.

In some embodiments, when the first base station determines that the reason why the first SIM in the terminal does not respond the paging of the first base station includes that the terminal communicates with the second base station via the second SIM, and if the first base station determines to page the first SIM based on its own requirement, the first base station may transmit the request information to the core network, to request the core network to indicate the second base station to pause communicating with the second SIM.

Accordingly, when the first base station still needs to page the first SIM, the core network may be requested to indicate the second base station to pause the communication process of the second SIM, and further the terminal may respond to the paging of the first base station by using the first SIM.

In some embodiments, service information that the second SIM communicates with the second base station may be further carried in the first indication information, and the first base station may determine service information to be performed by paging the first SIM, compare two pieces of service information, and may transmit the request information to the core network when determining that the service to be performed by the first SIM is relatively urgent.

Alternatively, the first base station may carry information of the service to be performed by paging the first SIM in the request information, and the core network determines which of the service for communicating with the second SIM and the service for paging the first SIM by the first base station is more urgent, and may select to indicate the second base station to pause communicating with the second SIM of the terminal when the service for paging the first SIM by the first base station is more urgent.

In some embodiments, it continues paging the first SIM in response to determining that the second base station pauses communicating with the second SIM according to the response information of the core network.

In some embodiments, when the core network indicates the second base station to pause communicating with the second SIM, the response information may be transmitted to the first base station, to inform the first base station that the second base station pauses communicating with the second SIM, and further the first SIM may continue paging the first SIM, for example, the first SIM in the terminal continually is paged.

In some embodiments, the method further includes: pausing paging the first SIM. The first base station may pause paging the first SIM in response to determining that the first SIM does not respond to paging, for example, the first base station may automatically pause paging the first SIM in response to receiving the second indication information or pause paging the first SIM in response to receiving an indication that the core network explicitly indicates pausing paging the first SIM, which is beneficial to avoiding resource wastes of the first SIM.

FIG. 8 is a schematic flowchart illustrating still another method for transceiving an indication according to embodiments of the disclosure. As illustrated in FIG. 8, pausing paging the first SIM includes following steps.

At step S801, a duration in which the first SIM does not respond to paging is determined according to the second indication information.

At step S802, paging the terminal is paused within the duration.

In some embodiments, the core network may determine the duration in which the first SIM in the terminal does not respond to the paging of the first base station, and transmit the duration carried in the first indication information to the first base station, so that the first base station learns the duration in which the first SIM in the terminal does not respond to the paging of the first base station.

For example, the duration in which the first SIM in the terminal does not respond to the paging of the first base station may be carried in the first indication information from the terminal to the core network, so that the core network may transmit the duration carried in the second indication information to the first base station. The first base station may at least pause paging the terminal within the duration when determining the duration, which avoids resource wastes caused due to the first base station within the duration continuing paging the terminal.

FIG. 9 is a schematic flowchart illustrating an indication method according to embodiments of the disclosure. The indication method in embodiments is applicable to a second base station. The second base station may communicate with a core network or a terminal as a UE.

The second base station includes but not limited to a base station in a communication system such as a 4G base station, a 5G base station, and a 6G base station. The terminal includes but not limited to a communication device such as a mobile phone, a tablet computer, a wearable device, a sensor, and an Internet of things device.

As illustrated in FIG. 9, the indication method may include the following step.

At step S901, first indication information is transmitted to a core network. The first indication information is configured to indicate that a first SIM in a multi-SIM terminal does not respond to paging.

In some embodiments, the first indication information is further configured to indicate that the first SIM in the multi-SIM terminal, paged by a first base station, has received paging of the first base station. Therefore, the core network may further indicate that the first SIM in the multi-SIM terminal paged by the first base station has received the paging of the first base station, via the second indication information, to the first base station, so that the first base station learns that the multi-SIM has received the paging of the first base station but does not respond to the paging, rather than not respond to the paging since the first SIM does not receive the paging of the first base station.

In some embodiments, the second base station communicates with a second SIM in the multi-SIM terminal, and before transmitting the first indication information to the core network, the method further includes: receiving busy indication information from the second SIM, and determining that the first SIM does not respond to paging according to the busy indication information.

In some embodiments, in a process that the terminal communicates with the second base station via the second SIM, if the first base station pages the first SIM, since the first SIM responding to the paging may influence the communication between the second SIM and the second base station, the terminal may determine for example based on service information of the communication between the second SIM and the second base station and service information corresponding to the paging received by the first SIM, whether to respond to the paging via the first SIM based on the requirement, which is illustrated in subsequent embodiments.

When the terminal determines that the paging is not responded via the first SIM, the second SIM that is communicating with the second base station transmits the busy indication information to the second base station, to inform the second base station that the first SIM in the terminal does not respond to the paging. Further, the second base station may transmit the first indication information to the core network, and inform the core network via the first indication information that the first SIM in the multi-SIM terminal paged by the first base station does not respond to the paging.

According to embodiments, when the second base station determines that the first SIM of the multi-SIM terminal does not respond to paging, the first indication information may be transmitted to the core network, so that the core network learns that the first SIM does not respond to paging, and the core network further transmits second indication information to the first base station, so that the first base station determines that the paged first SIM does not respond to paging, which is decided by the terminal where the first SIM is located, rather than a problem occurs in a paging process, which avoids resource wastes caused due to unnecessary operations performed by the first base station.

In some embodiments, the first indication information is further configured to indicate at least one of: information of the first SIM; information of the first base station; a reason why the first SIM does not respond to paging; or a duration in which the first SIM does not respond to paging.

The information of the first SIM may be, for example, an identity of the first SIM or a service corresponding to the paging received by the first SIM; and the information of the first base station may be, for example, an identity of the first base station.

The core network may determine that first indication information needs to be transmitted to the first base station based on the information of the first SIM and the information of the first base station, and the first base station may be informed via the first indication information that the first SIM has received the paging and does not respond to the paging, so that the first base station pauses paging the first SIM and does not pause paging other SIMs.

Of course, when the first indication information does not have the information of the first SIM and the information of the first base station, the second base station may determine that the first indication information needs to be transmitted to the first base station in other manners, for example, based on a historical communication record of the terminal.

In some embodiments, the first indication information is further configured to indicate a reason why the first SIM does not respond to paging.

In some embodiments, the second base station may determine the reason why the first SIM in the terminal does not respond to the paging of the first base station, and transmit the reason carried in the first indication information to the core network, and the reason is transmitted from the core network to the first base station, so that the core network and the first base station learn the reason why the first SIM in the terminal does not respond to the paging of the first base station.

For example, the terminal may transmit busy indication information to the second base station. The busy indication information may carry the reason why the first SIM in the terminal does not respond to the paging of the first base station, and the second base station may transmit the reason carried in the first indication information to the core network. The reason may be a direct reason, for example, the terminal is communicating with the second base station by using the second SIM, and the reason may be an indirect reason, for example, service information that the second SIM communicates with the second base station. The service information, for example, may be a type of service, a priority of service, a data volume of data to be transmitted by the service, etc.

The core network may determine the reason why the first SIM in the terminal does not respond to the paging of the first base station when receiving the first indication information, and further carry the reason in the second indication information and transmit the reason in the second indication information to the first base station, so that the first base station learns the reason why the first SIM in the terminal does not respond to the paging of the first base station.

FIG. 10 is a schematic flowchart illustrating another indication method according to embodiments of the disclosure. As illustrated in FIG. 10, the reason at least includes the second SIM in the multi-SIM terminal communicating with the second base station. The method further includes following steps.

At step S1001, third indication information from the core network is received. The third indication information is configured to indicate the second base station to pause communicating with the second SIM.

At step S1002, communicating with the second SIM is paused.

In some embodiments, when the core network determines that the second base station needs to pause communicating with the second SIM, the third indication information may be transmitted to the second base station, and the third indication information is configured to indicate the second base station to pause communicating with the second SIM.

A basis that the core network determines that the second base station needs to pause communicating with the second SIM, includes but not limited to the request information of the first base station being received by the core network, and the core network determining that the service to be performed by the first base station to page the first SIM is more urgent.

In some embodiments, the second base station may indicate the second SIM in the terminal to pause communicating with the second base station when receiving the third indication information, and the terminal may control the second SIM to pause communicating with the second base station, for example, to remain in a connected state and pause uplink and downlink communication with the second base station or may enter a non-connected state (such as an idle state and an inactive state). When the second SIM pauses communicating with the second base station, the terminal may respond to the paging of the first base station via the first SIM, for example, the terminal may initiate a random access to the first base station via the first SIM.

In some embodiments, the first indication information is further configured to indicate a duration in which the first SIM does not respond to paging.

In some embodiments, the second base station may determine a duration in which the first SIM in the terminal does not respond to the paging of the first base station, and transmit the duration carried in the first indication information to the core network, and the core network further transmits it to the first base station, so that the core network and the first base station learn the duration in which the first SIM in the terminal does not respond to the paging of the first base station.

For example, the duration in which the first SIM in the terminal does not respond to the paging of the first base station may be carried in the busy indication information that is transmitted from the terminal to the second base station, so that the second base station may transmit the duration carried in the first indication information to the core network, and the core network further transmits it to the first base station. The first base station may at least pause paging the terminal within the duration when determining the duration, which avoids resource wastes caused due to the first base station within the duration continuing paging the terminal.

FIG. 11 is a schematic flowchart illustrating an indication method according to embodiments of the disclosure. The indication method in the embodiment is applicable to a terminal. When the terminal is a multi-SIM terminal, multiple SIMs may be configured in the terminal, and the multiple SIMs at least include a second SIM and a first SIM.

The terminal may communicate with the second base station, may communicate with the first base station, or may communicate with the core network. For example, the terminal may communicate with the second base station via the second SIM and communicate with the first base station via the first SIM.

The second base station and the first base station include but not limited to a base station in a communication system such as a 4G base station, a 5G base station, and a 6G base station. The terminal includes but not limited to a communication device such as a mobile phone, a tablet computer, a wearable device, a sensor, and an Internet of things device.

As illustrated in FIG. 11, the indication method may include the following step.

At step S1101, first indication information is transmitted to the core network. The first indication information is configured to indicate that the first SIM does not respond to paging.

In an example, the terminal may communicate with the second base station via the second SIM and communicate with the first base station via the first SIM.

In a process that the terminal communicates with the second base station via the second SIM, if the first base station pages the first SIM, since the first SIM responding to the paging may influence the communication between the second SIM and the second base station, the terminal may determine based on the requirement whether to respond to the paging via the first SIM, for example, based on service information of communication between the second SIM and the second base station and service information corresponding to the paging received by the first SIM.

When the terminal determines that the paging is not responded via the first SIM, the terminal may transmit the first indication information to the core network, to inform the core network that the first SIM in the terminal does not respond to paging. For example, it may indicate that the first SIM has received the paging of the first base station and the first SIM does not respond to the paging. Therefore, the core network may further indicate via the second indication information that the first SIM in the multi-SIM terminal paged by the first base station has received the paging of the first base station to the first base station, so that the first base station learns that the multi-SIM has received the paging of the first base station, but does not respond to the paging, rather than not respond to the paging since the first SIM does not receive the paging of the first base station.

According to embodiments, the terminal may transmit the first indication information to the core network in response to the first SIM not responding to the paging, and further the core network transmits the second indication information to the first base station, so that the core network and the first base station learn that the first SIM in the multi-SIM terminal does not respond to the paging, to ensure that the first base station may not mistakenly think that the response of the first SIM is not received because there is a paging problem, which avoids resource wastes caused by further performing unnecessary operations.

In some embodiments, the first indication information is further configured to indicate at least one of: information of the first SIM; information of the first base station; a reason why the first SIM does not respond to paging; or a duration in which the first SIM does not respond to paging.

The information of the first SIM, for example, may be an identity of the first SIM or a service corresponding to paging received by the first SIM; and the information of the first base station, for example, may be an identity of the first base station.

The core network may determine that the first indication information needs to be transmitted to the first base station based on the information of the first SIM and the information of the first base station, and the first base station may be informed via the first indication information that the first SIM has received paging and does not respond to the paging, so that the first base station pauses paging the first SIM, and does not pause paging other SIMs.

Of course, when the first indication information does not have the information of the first SIM and the information of the first base station, the second base station may determine that the first indication information needs to be transmitted to the first base station in other manners, for example, based on a historical communication record of the terminal.

In some embodiments, it is determined that the first SIM does not respond to paging based on at least one of: service information that the second SIM in the multi-SIM terminal communicates with the second base station; or service information corresponding to the paging.

In some embodiments, a basis for determining that the first SIM does not respond to the paging of the first base station, may be configured by the core network, for example, it may be configured to a terminal via a non-access layer signaling or may be configured by the base station such as via a radio control access layer signaling, or may be determined by the terminal.

It should be noted that, the basis includes, but is not limited to, the above two cases, and specific service information may be various, for example, a priority of the service, an identity of the service, and a quality of service of the service.

For example, when the service information includes the priority of the service, the terminal may compare priorities of two services, and when the priority of the service for the second SIM to communicate with the second base station is relatively high, it may be determined that the first SIM does not respond to paging.

For example, the service information includes an identity of the service. The terminal may only determine whether the service in which the second SIM communicates with the second base station is a specific service based on the identity of the service, and in the case of the specific service, the terminal may determine that the first SIM does not respond to paging.

FIG. 12 is a schematic flowchart illustrating another indication method according to embodiments of the disclosure. As illustrated in FIG. 12, the method further includes following steps.

At step S1201, pause indication information from a second base station is received.

At step S1202, the second base station communicating with the second SIM is paused.

At step S1203, the paging is responded via the first SIM.

In some embodiments, when the first base station determines that the reason why the first SIM in the terminal does not respond to the paging of the first base station includes the terminal communicating with the second base station via the second SIM, if the terminal determines to page the first SIM based on its own requirement, the first base station may transmit the request information to the core network, to request the core network to indicate the second base station to pause communicating with the second SIM terminal.

The core network may determine whether to pause the communication between the second base station and the second SIM based on the requirement, and may transmit the third indication information to the second base station to indicate the second base station to pause communicating with the second SIM in response to determining that the communication between the second base station and the second SIM needs to be paused.

The second base station may further transmit the pause indication information to the terminal in response to receiving the third indication information, to indicate the terminal to pause communicating with the second base station via the second SIM, thus the terminal may pause communicating with the second base station via the second SIM and respond to paging via the first SIM.

In an example, when the terminal pauses communicating with the second base station via the second SIM, if the paging of the first base station has been received via the first SIM, the paging may be responded via the first SIM. And if the paging of the first base station is not received, the paging that has been received may be selected not responded.

It should be noted that, steps executed by the second base station and the first base station in the above embodiments are applicable to two base stations, for example, in a process that the first base station communicates with the first SIM, the second base station pages the second SIM, and the terminal decides not to respond to the paging of the second base station, thus the second base station may execute steps of the first base station, and the first base station may execute steps of the second base station, and correspondingly, the second SIM and the first SIM may be exchanged.

Corresponding to the above embodiments of the method for transceiving an indication, the indication method, and the method for determining a response, an apparatus for transceiving an indication, an indication apparatus, and an apparatus for determining a response are further provided in the embodiments of the disclosure.

FIG. 13 is a schematic block diagram illustrating an apparatus for transceiving an indication according to embodiments of the disclosure. The indication apparatus as illustrated in the embodiments is applicable to a core network. The core network may communicate with a first base station, a second base station, or a terminal.

The second base station and the first base station include but not limited to a base station in a communication system such as a 4G base station, a 5G base station, and a 6G base station. The terminal includes but not limited to a communication device such as a mobile phone, a tablet computer, a wearable device, a sensor, and an Internet of things device.

In some embodiments, the terminal may be a multi-SIM terminal. Multiple SIMs may be configured in the terminal. Embodiments of the disclosure are illustrated when the terminal is configured with a first SIM and a second SIM.

As illustrated in FIG. 13, the apparatus for transceiving an indication may include an indication receiving module 1301.

The indication receiving module 1301 is configured to receive first indication information from a communication device. The first indication information is configured to indicate that a first SIM in a multi-SIM terminal does not respond to paging.

In some embodiments, the first indication information is further configured to indicate that the first SIM in the multi-SIM terminal, paged by a first base station, has received paging of the first base station.

In some embodiments, the apparatus further includes: an indication transmitting module, configured to transmit second indication information to a first base station. The second indication information is configured to indicate that the first SIM in the multi-SIM terminal does not respond to paging.

In some embodiments, the communication device includes at least one of: a terminal or a base station.

In some embodiments, the first indication information is further configured to indicate a reason why the first SIM does not respond to paging.

FIG. 14 is a schematic block diagram illustrating another apparatus for transceiving an indication according to embodiments of the disclosure. As illustrated in FIG. 14, the reason at least includes a second SIM in the multi-SIM terminal communicating with a second base station. The apparatus further includes a request receiving module 1401.

The request receiving module 1401 is configured to receive request information from the first base station. The request information is configured to request the core network to indicate the second base station to pause communicating with the second SIM.

FIG. 15 is a schematic block diagram illustrating still another apparatus for transceiving an indication according to embodiments of the disclosure. As illustrated in FIG. 15, the apparatus further includes a pause indication module 1501.

The pause indication module 1501 is configured to transmit third indication information to the second base station. The third indication information is configured to indicate the second base station to pause communicating with the second SIM.

FIG. 16 is a schematic block diagram illustrating still another apparatus for transceiving an indication according to embodiments of the disclosure. As illustrated in FIG. 16, the apparatus further includes a related receiving module 1601.

The related receiving module 1601 is configured to receive information related to the paging from the communication device. The third indication information is transmitted to the second base station in response to determining that the second SIM pauses communicating according to the information related to the paging.

In some embodiments, the first indication information is further configured to indicate a duration in which the first SIM does not respond to paging.

FIG. 17 is a schematic block diagram illustrating an apparatus for determining a response according to embodiments of the disclosure. The apparatus for transceiving an indication as illustrated in the disclosure is applicable to a first base station. The first base station may communicate with a core network or a terminal as a UE.

The first base station includes but not limited to a base station in a communication system such as a 4G base station, a 5G base station, and a 6G base station. The terminal includes but not limited to a communication device such as a mobile phone, a tablet computer, a wearable device, a sensor, and an Internet of things device.

As illustrated in FIG. 17, the apparatus for determining the response may include an indication receiving module 1701 and a response determining module 1702.

The indication receiving module 1701 is configured to receive second indication information from a core network.

The response determining module 1702 is configured to, determine that a first SIM in the multi-SIM terminal does not respond to paging according to the second indication information.

In some embodiments, the response determining module, is configured to determine, according to the second indication information, that the first SIM in the multi-SIM terminal, paged by the first base station, has received paging of the first base station and the first SIM does not respond to the paging.

Figure 18:
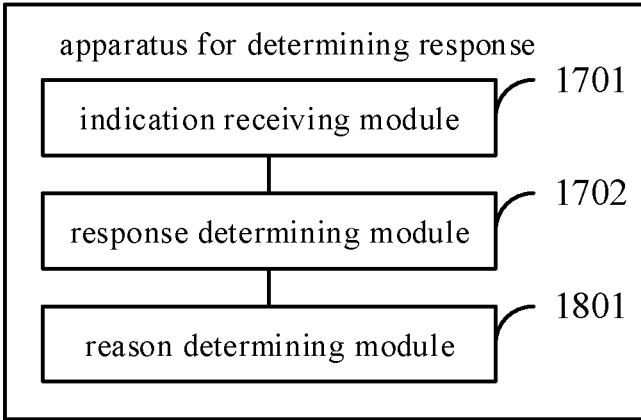
FIG. 18 is a schematic block diagram illustrating another apparatus for determining a response according to embodiments of the disclosure.

FIG. 18 is a schematic block diagram illustrating another apparatus for determining a response according to embodiments of the disclosure. As illustrated in FIG. 18, the apparatus further includes a reason determining module 1801.

The reason determining module 1801 is configured to determine a reason why the first SIM does not respond to paging according to first indication information.

Figure 19:
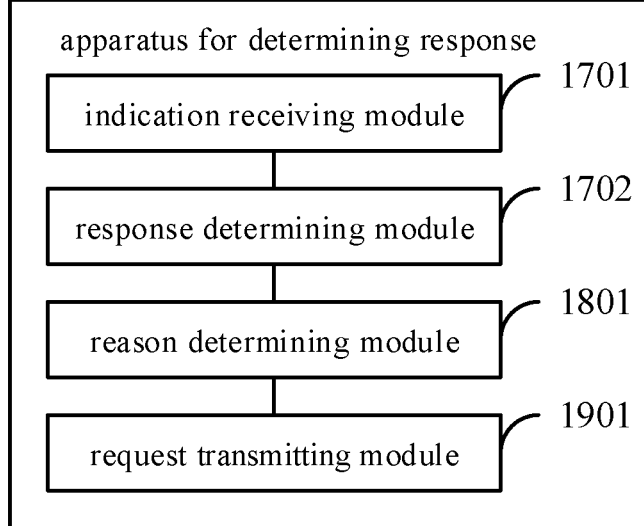
FIG. 19 is a schematic block diagram illustrating still another apparatus for determining a response according to embodiments of the disclosure.

FIG. 19 is a schematic block diagram illustrating still another apparatus for determining a response according to embodiments of the disclosure. As illustrated in FIG. 19, the apparatus further includes a request transmitting module 1901.

The request transmitting module 1901 is configured to transmit request information to the core network in response to the reason at least including a second SIM in the multi-SIM terminal communicating with a second base station. The request information is configured to request the core network to indicate the second base station to pause communicating with the second SIM.

In some embodiments, the response determining module is further configured to continue paging the first SIM in response to determining that the second base station pauses communicating with the second SIM based on the response information of the core network.

In some embodiments, the apparatus further includes: a paging control module, configured to pause paging the first SIM.

In some embodiments, the paging control module, is configured to determine a duration in which the first SIM does not respond to paging according to the first indication information; and pause paging the terminal within the duration.

Figure 20:
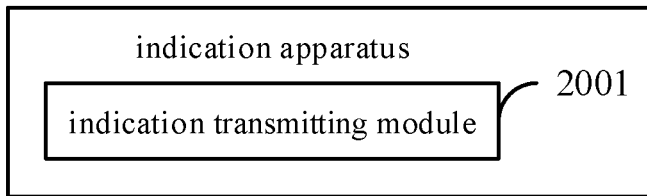
FIG. 20 is a schematic block diagram illustrating an indication apparatus applicable to a second base station according to embodiments of the disclosure.

FIG. 20 is a schematic block diagram illustrating an indication apparatus according to embodiments of the disclosure. The indication apparatus in the embodiment is applicable to a second base station, and the second base station may communicate with a core network, or may communicate with a terminal as a UE.

The second base station includes but not limited to a base station in a communication system such as a 4G base station, a 5G base station, and a 6G base station. The terminal includes but not limited to a communication device such as a mobile phone, a tablet computer, a wearable device, a sensor, and an Internet of things device.

As illustrated in FIG. 20, the indication apparatus may include an indication transmitting module 2001.

The indication transmitting module 2001 is configured to transmit first indication information to the core network. The first indication information is configured to indicate that a first SIM in a multi-SIM terminal does not respond to paging.

In some embodiments, the first indication information is further configured to indicate that the first SIM in the multi-SIM terminal, paged by a first base station, has received paging of the first base station.

In some embodiments, the second base station communicates with a second SIM in the multi-SIM terminal. The apparatus further includes: an indication receiving module, configured to receive busy indication information from the second SIM, and determine that the first SIM does not respond to paging according to the busy indication information.

In some embodiments, the first indication information is further configured to indicate a reason why the first SIM does not respond to paging.

Figure 21:
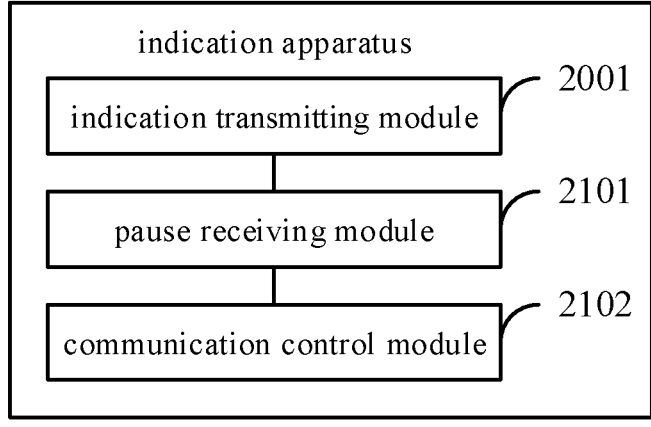
FIG. 21 is a schematic block diagram illustrating another indication apparatus according to embodiments of the disclosure.

FIG. 21 is a schematic block diagram illustrating another indication apparatus according to embodiments of the disclosure. As illustrated in FIG. 21, the reason at least includes a second SIM in the multi-SIM terminal communicating with the second base station. The apparatus further includes a pause receiving module 2101 and a communication control module 2102.

The pause receiving module 2101 is configured to receive third indication information from the core network. The third indication information is configured to indicate the second base station to pause communicating with the second SIM.

The communication control module 2102 is configured to pause communicating with the second SIM.

In some embodiments, the first indication information is further configured to indicate a duration in which the first SIM does not respond to paging.

Figure 22:
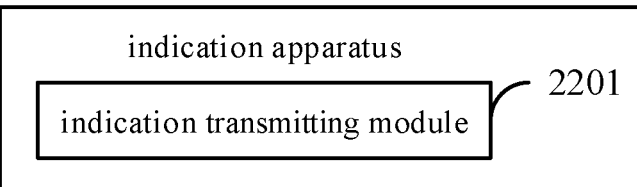
FIG. 22 is a schematic block diagram illustrating an indication apparatus applicable to a terminal according to embodiments of the disclosure.

FIG. 22 is a schematic block diagram illustrating an indication apparatus according to embodiments of the disclosure. The indication apparatus in the embodiment is applicable to a terminal. When the terminal is a multi-SIM terminal, multiple SIMs may be configured in the terminal, and the multiple SIMs at least include a second SIM and a first SIM.

The terminal may communicate with the second base station, or may communicate with the first base station, or may communicate with the core network. For example, the terminal may communicate with the second base station via the second SIM, and communicate with the first base station via the first SIM.

The second base station and the first base station include but not limited to a base station in a communication system such as a 4G base station, a 5G base station, and a 6G base station. The terminal includes but not limited to a communication device such as a mobile phone, a tablet computer, a wearable device, a sensor, and an Internet of things device.

As illustrated in FIG. 22, the indication apparatus may include an indication transmitting module 2201.

The indication transmitting module 2201 is configured to transmit first indication information to the core network. The first indication information is configured to indicate that the first SIM does not respond to paging.

In some embodiments, the first indication information is further configured to indicate that the first SIM has received paging of a first base station.

In some embodiments, the first indication information is further configured to indicate at least one of: information of the first SIM; information of the first base station; a reason why the first SIM does not respond to paging; or a duration in which the first SIM does not respond to paging.

In some embodiments, determining that the first SIM does not respond to paging based on at least one of: service information that a second SIM in the multi-SIM terminal communicates with a second base station; or service information corresponding to the paging.

Figure 23:
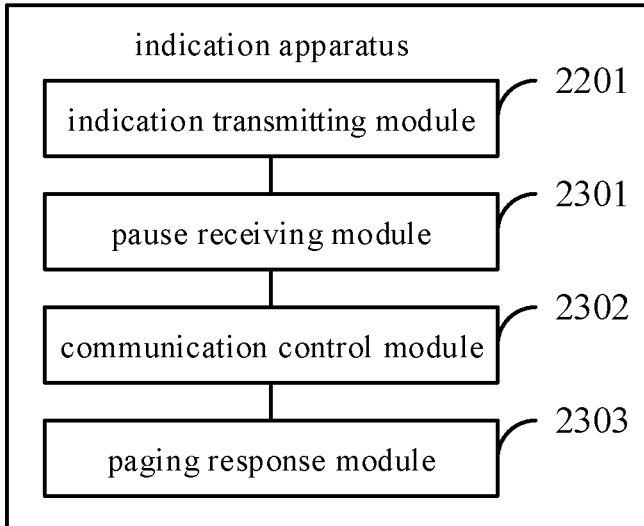
FIG. 23 is a schematic block diagram illustrating another indication apparatus according to embodiments of the disclosure.

FIG. 23 is a schematic block diagram illustrating another indication apparatus according to embodiments of the disclosure. As illustrated in FIG. 23, the apparatus further includes a pause receiving module 2301, a communication control module 2302 and a paging response module 2303.

The pause receiving module 2301 is configured to receive pause indication information from the second base station.

The communication control module 2302 is configured to pause the second SIM communicating with the second base station.

The paging response module 2303 is configured to respond to paging via the first SIM.

With respect to the apparatuses in the above embodiments, the specific manners for performing operations for individual modules therein have been described in detail in the embodiments regarding the methods, which will not be elaborated herein.

For the apparatus embodiments, since they basically correspond to the method embodiments, reference may be made to the partial descriptions of the method embodiments for related parts. The apparatus embodiments described above are only illustrative, in which modules described as separate components may or may not be physically separated, and components displayed as modules may or may not be physical modules, that is, they may be located in one place or distributed on multiple network modules. Some or all of the modules may be selected according to actual needs to achieve purposes of solutions in embodiments. Those skilled in the art can understand and implement it without creative effort.

According to embodiments of the disclosure, a communication device is provided and includes: a processor; and a memory for storing a computer program; when the computer program is executed by the processor, the method for transceiving the indication as described in the above any one embodiment is implemented.

According to embodiments of the disclosure, a communication device is provided and includes: a processor; and a memory for storing a computer program; when the computer program is executed by the processor, the method for determining a response and/or the indication method applicable to the second base station as described in the above any one embodiment is implemented.

According to embodiments of the disclosure, a communication device is provided and includes: a processor; and a memory for storing a computer program; when the computer program is executed by the processor, the indication method applicable to the terminal as described in the above any one embodiment is implemented.

According to embodiments of the disclosure, a computer-readable storage medium for storing a computer program is provided. When the computer program is executed by a processor, steps of the method for transceiving an indication described in the above any one embodiment are implemented.

According to embodiments of the disclosure, a computer-readable storage medium for storing a computer program is provided. When the computer program is executed by a processor, steps of the method for determining a response and/or the indication method applicable to the second base station as described in the above any one embodiment are implemented.

According to embodiments of the disclosure, a computer-readable storage medium for storing a computer program is provided. When the computer program is executed by a processor, steps of the indication method applicable to the terminal described in the above any one embodiment are implemented.

Figure 24:
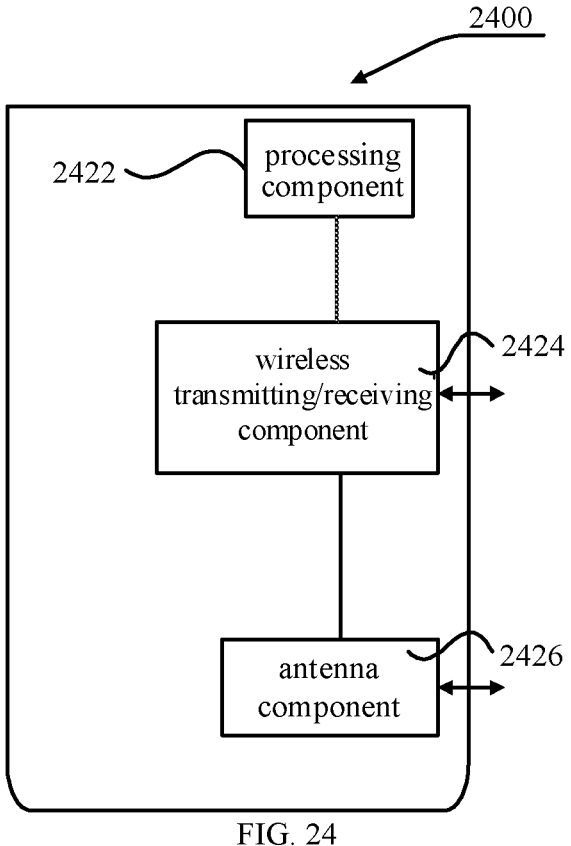
FIG. 24 is a schematic block diagram illustrating an indication device and/or a device for determining a response applicable to a base station according to embodiments of the disclosure.

FIG. 24 is a schematic block diagram illustrating an indication device 2400 and/or a device 2400 for determining a response according to embodiments of the disclosure. The device 2400 may be provided as a base station such as the first base station and the second base station. As illustrated in FIG. 24, the device 2400 includes a processing component 2422, a wireless transmitting/receiving component 2424, an antenna component 2426, and a signal processing unit peculiar to a wireless interface. The processing component 2422 may further include one or more processors. One processor of the processing component 2422 may be configured to implement the indication method applicable to the second base station and/or the method for determining a response in the above any embodiment.

Figure 25:
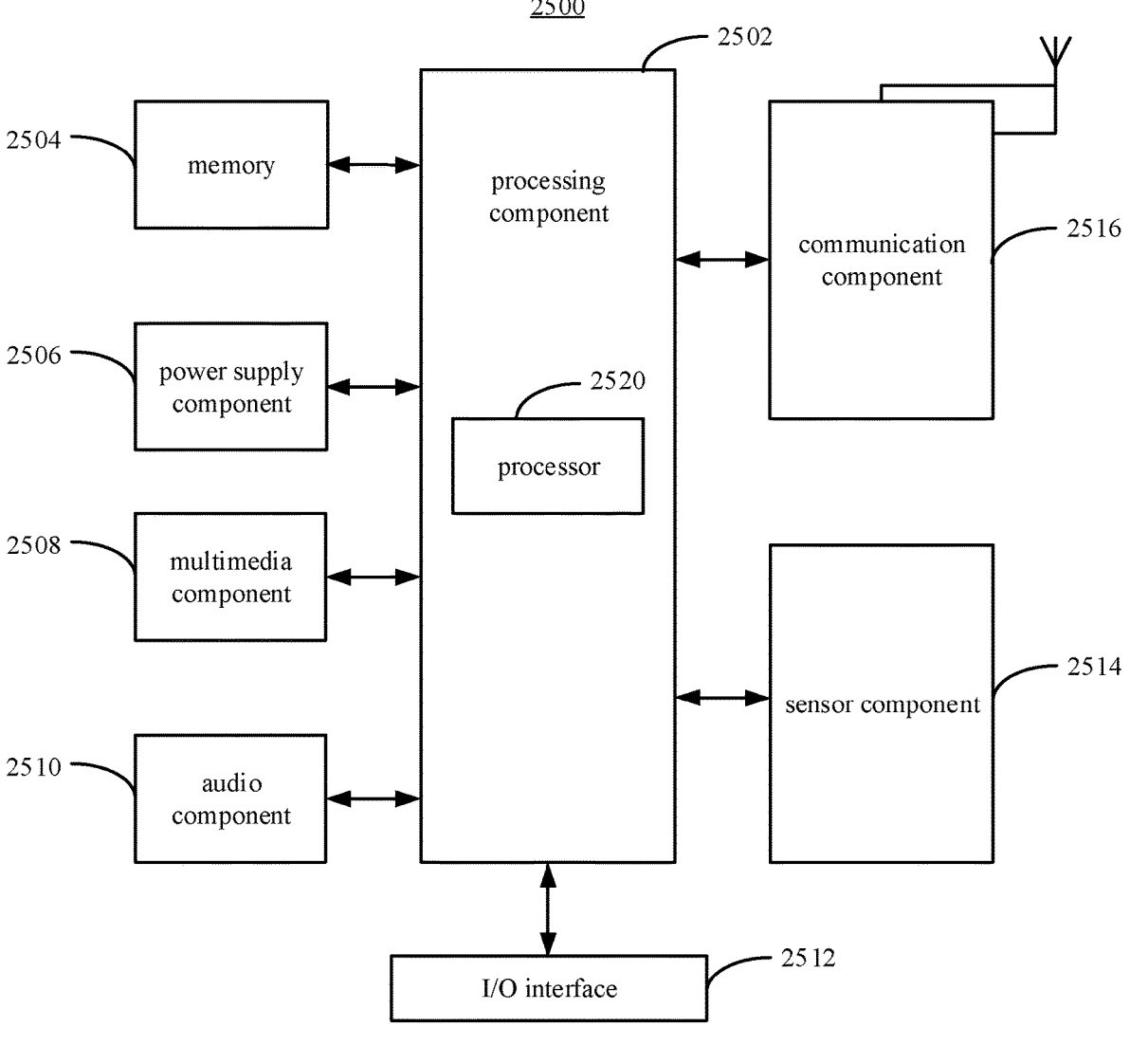
FIG. 25 is a schematic block diagram illustrating an indication device according to embodiments of the disclosure.

FIG. 25 is a schematic block diagram illustrating an indication device 2500 according to embodiments of the disclosure. For example, the device 2500 may be a mobile phone, a computer, a digital broadcasting terminal, a messaging device, a game console, a tablet device, a medical equipment, a fitness equipment, a personal digital assistant, etc.

As illustrated FIG. 25, the device 2500 may include one or more components: a processing component 2502, a memory 2504, a power supply component 2506, a multimedia component 2508, an audio component 2510, an input/output (I/O) interface 2512, a sensor component 2514, and a communication component 2516.

The processing component 2502 generally controls the whole operation of the device 2500, such as operations related to display, phone call, data communication, camera operation and recording operation. The processing component 2502 may include one or more processors 2520 to perform instructions, to complete all or part of steps of the above indication method applicable to the terminal. In addition, the processing component 2502 may include one or more modules for the convenience of interaction between the processing component 2502 and other components. For example, the processing component 2502 may include a multimedia module for the convenience of interaction between the multimedia component 2508 and the processing component 2502.

The memory 2504 is configured to store all types of data to support the operation of the device 2500. Examples of the data include the machine-readable instructions of any applications or methods operated on the device 2500, contact data, phone book data, messages, pictures, videos, etc. The memory 2504 may be implemented by any type of volatile or non-volatile storage devices or their combination, such as a static random access memory (SRAM), an electrically erasable programmable read-only memory (EEPROM), an erasable programmable read-only (EPROM), a programmable read-only memory (PROM), a read-only memory (ROM), a magnetic memory, a flash memory, a magnetic disk or an optical disk.

The power supply component 2506 may provide power supply for all components of the device 2500. The power supply component 2506 may include power supply management system, one or more power supplies, and other units related to generating, managing and distributing power for the device 2500.

The multimedia component 2508 includes an output interface screen provided between the device 2500 and the user. In some embodiments, the screen may include a liquid crystal display (LCD) and a touch panel (TP). When the screen includes a touch panel, the screen may be implemented as a touch screen to receive input signals from the user. The touch panel includes one or more touch sensors to sense touch, slide and gestures on the touch panel. The touch sensor may not only sense the boundary of touch or slide action, but also detect the duration and pressure related to the touch or slide operation. In some embodiments, the multimedia component 2508 includes a front camera and/or a rear camera. When the device 2500 is in an operation mode, such as a shooting mode or a video mode, the front camera or the rear camera may receive external multimedia data. Each front camera and rear camera may be a fixed optical lens system or an optical lens system with a focal length and an optical zoom capacity.

The audio component 2510 is configured as an output and/or input signal. For example, the audio component 2510 includes a microphone (MIC). When the device 2500 is in operation mode, such as call mode, record mode, and speech recognition mode, the microphone is configured to receive the external audio signals. The audio signals received may be further stored in the memory 2504 or transmitted via the communication component 2516. In some embodiments, the audio component 2510 further includes a speaker configured to output an audio signal.

The I/O interface 2512 provides an interface for the processing component 2502 and the peripheral interface module, and the peripheral interface module may be a keyboard, a click wheel, a button, etc. The buttons may include but not limited to a home button, a volume button, a start button and a lock button.

The sensor component 2514 includes one or more sensors, configured to provide various aspects of status assessment for the device 2500. For example, the sensor component 2514 may detect the on/off state of the device 2500 and the relative positioning of the component. For example, the component is a display and a keypad of the device 2500. The sensor component 2514 may further detect the location change of the device 2500 or one component of the device 2500, the presence or absence of contact between the user and the device 2500, the orientation or acceleration/deceleration of the device 2500, and the temperature change of the device 2500. The sensor component 2514 may include a proximity sensor, which is configured to detect the existence of the objects nearby without any physical contact. The sensor component 2514 may further include a light sensor such as a CMOS or CCD image sensor, which is configured to use in imaging applications. In some embodiments, the sensor component 2514 may further include an acceleration transducer, a gyroscope sensor, a magnetic sensor, a pressure sensor or a temperature sensor.

The communication component 2516 is configured for the convenience of wire or wireless communication between the device 2500 and other devices. The device 2500 may access wireless networks based on communication standard, such as WiFi, 2G or 3G, 4G long term evolution (LTE), 5G new radio (NR), or a combination thereof. In some embodiments, the communication component 2516 receives broadcast signals or broadcast-related information from an external broadcast management system via a broadcast channel. In some embodiments, the communication component 2516 further includes a near field communication (NFC) module to facilitate short-range communication. For example, an NFC module may be implemented based on a radio frequency identification (RFID) technology, an infrared data association (IRDA) technology, an ultra-wideband (UWB) technology, bluetooth (BT) technology and other technologies.

In some embodiments, the device 2500 may be implemented by one or more application specific integrated circuits (ASIC), digital signal processors (DSP), digital signal processing devices (DSPD), programmable logic devices (PLD), field programmable gate arrays (FPGA), controllers, microcontrollers, microprocessors or other electronics components, which is configured to perform the indication method applicable to a terminal.

In some embodiments, a non-transitory computer-readable storage medium including instructions is further provided, such as the memory 2504 including instructions. The instructions may be executed by the processor 2520 of the device 2500 to complete the above indication method applicable to the terminal. For example, the non-transitory computer-readable storage medium may be a ROM, a random access memory (RAM), a CD-ROM, a magnetic tape, a floppy disk, an optical data storage device, etc.

Other embodiments of the disclosure will be apparent to a person skilled in the art from consideration of the specification and practice of the disclosure disclosed here. This application is intended to cover any variations, uses, or adaptations of the disclosure following the general principles thereof and including such departures from the disclosure as come within known or customary practice in the art. It is intended that the specification and examples be considered as exemplary only, with a true scope and spirit of the disclosure being indicated by the following claims.

It will be appreciated that the disclosure is not limited to the exact construction that has been described above and illustrated in the accompanying drawings, and that various modifications and changes can be made without departing from the scope thereof. It is intended that the scope of the disclosure only be limited by the appended claims.

It should be noted that, in the disclosure, relational terms such as first and second are used only to distinguish one entity or operation from another entity or operation, and do not necessarily require or imply any such actual relationship or sequence exists between these entities or operations. The terms "comprising", "including" or any other variation thereof are intended to encompass non-exclusive inclusion such that a process, method, article, or device including a list of elements includes not only those elements, but also other elements not expressly listed, or also include elements inherent to such the process, method, article, or device. Without further limitation, an element qualified by the phrase "including a . . . " does not preclude the presence of additional identical elements in the process, method, article, or device that includes the element.

The methods and apparatuses or devices provided by embodiments of the disclosure have been described in detail above, and specific examples are used to illustrate the principles and implementations of the disclosure. At the same time, for those skilled in the art, according to the idea of the disclosure, there will be changes in the specific implementation and application scope. In summary, the content of this specification should not be construed as limiting the disclosure.

What is claimed is:

1. A method for transceiving an indication, performed by a core network, the method comprising:
   receiving first indication information from a communication device, wherein the first indication information is configured to indicate that a first subscriber identity module (SIM) in a multi-SIM terminal does not respond to paging, wherein the first indication information is further configured to perform indicating a reason why the first SIM does not respond to the paging, the reason at least comprises a second SIM in the multi-SIM terminal communicating with a second base station;
   transmitting second indication information to a first base station, wherein the second indication information is configured to indicate that the first SIM in the multi-SIM terminal does not respond to paging;
   receiving request information from the first base station, wherein the request information is configured to request the core network to indicate the second base station to pause communicating with the second SIM.

2. The method according to claim 1, wherein the first indication information is further configured to perform:
   indicating that the first SIM in the multi-SIM terminal, paged by a first base station, has received paging of the first base station.

3. The method according to claim 1, further comprising:
   pausing paging the first SIM.

4. The method according to claim 1, wherein the communication device comprises at least one of:
   a terminal or a base station.

5. The method according to claim 1, further comprising:
   transmitting third indication information to the second base station;
   wherein the third indication information is configured to indicate the second base station to pause communicating with the second SIM; or
   receiving information related to the paging from the communication device; and
   transmitting third indication information to the second base station in response to determining that the second SIM pauses communicating according to the information related to the paging.

6. The method according to claim 1, wherein the first indication information is further configured to indicate a duration in which the first SIM does not respond to paging.

7. A communication device, comprising:
   a processor; and
   a memory for storing machine-readable instructions that, when executed by the processor, cause the processor to execute the method of claim 1.

8. A method for determining a response, performed by a first base station, the method comprising:
   receiving second indication information from a core network; and
   determining that a first subscriber identity module (SIM) in a multi-SIM terminal does not respond to paging according to the second indication information;
   determining a reason why the first SIM does not respond to paging according to the second indication information;
   transmitting request information to the core network in response to the reason at least comprising a second SIM in the multi-SIM terminal communicating with a second base station;
   wherein the request information is configured to request the core network to indicate the second base station to pause communicating with the second SIM; or
   continuing paging the first SIM in response to determining that the second base station pauses communicating with the second SIM according to response information of the core network.

9. The method according to claim 8, wherein determining that the first SIM in the multi-SIM terminal does not respond to paging according to the second indication information comprises:

determining, according to the second indication information, that the first SIM in the multi-SIM terminal, paged by the first base station, has received paging of the first base station and the first SIM does not respond to the paging.

10. The method according to claim 8, further comprising:

pausing paging the first SIM;

wherein pausing paging the first SIM comprises:

determining a duration in which the first SIM does not respond to paging according to the second indication information; and pausing paging the terminal within the duration.

11. A communication device, comprising:

a processor; and a memory for storing machine-readable instructions that, when executed by the processor, cause the processor to execute the method of claim 8.

12. An indication method, performed by a terminal configured with a second subscriber identity module (SIM) and a first SIM, and the method comprising:

transmitting first indication information to a core network;

receiving pause indication information from a second base station;

pausing a communication between the second SIM and the second base station; and responding to the paging via the first SIM;

wherein the first indication information is configured to indicate that the first SIM does not respond to paging.

13. The method according to claim 12, wherein the first indication information is further configured to indicate that the first SIM has received paging of a first base station.

14. The method according to claim 12, wherein the first indication information is further configured to indicate at least one of:

information of the first SIM;

information of a first base station;

a reason why the first SIM does not respond to paging; or a duration in which the first SIM does not respond to paging.

15. A communication device, comprising:

a processor; and a memory for storing machine-readable instructions that, when executed by the processor, cause the processor to execute the method of claim 12.

\* \* \* \* \*